US011216389B2

(12) United States Patent
Kumar et al.

(10) Patent No.: US 11,216,389 B2
(45) Date of Patent: Jan. 4, 2022

(54) DEVICE WITH MULTIPLE ROOTS OF TRUST

(71) Applicant: CRYPTOGRAPHY RESEARCH, INC., Sunnyvale, CA (US)

(72) Inventors: Ambuj Kumar, Sunnyvale, CA (US); William Craig Rawlings, Saratoga, CA (US)

(73) Assignee: CRYPTOGRAPHY RESEARCH, INC., San Francisco, CA (US)

( * ) Notice: Subject to any disclaimer, the term of this patent is extended or adjusted under 35 U.S.C. 154(b) by 0 days.

(21) Appl. No.: 15/780,005

(22) PCT Filed: Dec. 1, 2016

(86) PCT No.: PCT/US2016/064451
§ 371 (c)(1),
(2) Date: May 30, 2018

(87) PCT Pub. No.: WO2017/096060
PCT Pub. Date: Jun. 8, 2017

(65) Prior Publication Data
US 2018/0357183 A1    Dec. 13, 2018

Related U.S. Application Data

(60) Provisional application No. 62/262,217, filed on Dec. 2, 2015.

(51) Int. Cl.
*G06F 21/14* (2013.01)
*G06F 12/14* (2006.01)
(Continued)

(52) U.S. Cl.
CPC .......... *G06F 12/1408* (2013.01); *G06F 21/57* (2013.01); *G06F 21/6281* (2013.01);
(Continued)

(58) Field of Classification Search
CPC ................ G06F 12/1408; H04L 9/0897
(Continued)

(56) References Cited

U.S. PATENT DOCUMENTS

| 7,316,027 B2 | 1/2008 | Burch et al. |
| 7,382,880 B2 | 6/2008 | Angelo et al. |

(Continued)

FOREIGN PATENT DOCUMENTS

| WO | WO-2016-032975 A1 | 3/2016 |
| WO | WO-2017-027532 A1 | 2/2017 |

OTHER PUBLICATIONS

Liu, "Embedded Reconfigurable Logic for ASIC Design Obfuscation Against Supply Chain Attacks", 2014, EDAA, pp. 1-6 (Year: 2014).*

(Continued)

*Primary Examiner* — David J Pearson
*Assistant Examiner* — Gregory A Lane
(74) *Attorney, Agent, or Firm* — Lowenstein Sandler LLP

(57) ABSTRACT

A container from a first root of trust associated with a first root entity may be received. The container may correspond to a mapping of a resource of an integrated circuit that is associated with the first root entity. The container may be verified based on a key that corresponds to the first root of trust and that is stored in the integrated circuit at manufacturing of the integrated circuit. An identification may be made that an assignment of the resource from the container corresponds to assigning the resource from the first root of trust to a new root of trust. A new key corresponding to the new root of trust may be generated. Information corresponding to the new key may be stored into a memory of the integrated circuit. Furthermore, the new key may be used to delegate the resource to a subsequent container.

20 Claims, 15 Drawing Sheets

(51) Int. Cl.
*G06F 21/57* (2013.01)
*G06F 21/62* (2013.01)
*H04L 29/06* (2006.01)
*H04L 9/08* (2006.01)
*H04L 9/32* (2006.01)

(52) U.S. Cl.
CPC ............ *H04L 9/088* (2013.01); *H04L 9/0897* (2013.01); *H04L 9/3247* (2013.01); *H04L 63/00* (2013.01); *H04L 63/10* (2013.01); *H04L 63/126* (2013.01); *G06F 2212/1052* (2013.01); *G06F 2221/2145* (2013.01)

(58) Field of Classification Search
USPC .......................................................... 713/193
See application file for complete search history.

(56) References Cited

U.S. PATENT DOCUMENTS

| | | | |
|---|---|---|---|
| 7,631,188 B2 | 12/2009 | Valente | |
| 7,945,786 B2* | 5/2011 | Kumar | G06F 9/45558 |
| | | | 713/187 |
| 8,271,783 B2 | 9/2012 | Ibrahim et al. | |
| 8,843,764 B2 | 9/2014 | Hussain | |
| 8,874,916 B2 | 10/2014 | Smith et al. | |
| 10,083,306 B2* | 9/2018 | Smith | G06F 21/71 |
| 2005/0033987 A1* | 2/2005 | Yan | G06F 21/57 |
| | | | 726/4 |
| 2005/0132229 A1* | 6/2005 | Zhang | H04L 9/3265 |
| | | | 726/4 |
| 2008/0184028 A1* | 7/2008 | Anson | G06F 21/57 |
| | | | 713/156 |
| 2009/0323971 A1 | 12/2009 | Munguia et al. | |
| 2010/0023755 A1* | 1/2010 | Kotani | H04L 9/3263 |
| | | | 713/156 |
| 2010/0082991 A1* | 4/2010 | Baldwin | H04L 9/083 |
| | | | 713/176 |
| 2011/0154010 A1* | 6/2011 | Springfield | G06F 21/57 |
| | | | 713/100 |
| 2012/0233463 A1 | 9/2012 | Holt et al. | |
| 2014/0095876 A1* | 4/2014 | Smith | H04L 9/3265 |
| | | | 713/171 |
| 2014/0195807 A1 | 7/2014 | Bar-El et al. | |
| 2014/0380031 A1 | 12/2014 | Jones et al. | |
| 2015/0261950 A1 | 9/2015 | Schulz et al. | |
| 2015/0326543 A1 | 11/2015 | Pochuev et al. | |
| 2016/0154744 A1* | 6/2016 | Zheng | H04L 9/0822 |
| | | | 713/193 |
| 2016/0182238 A1* | 6/2016 | Dewan | H04L 9/3242 |
| | | | 713/171 |

OTHER PUBLICATIONS

Notification Concerning Transmittal of International Preliminary Report on Patentability dated Jun. 14, 2018 re: Int'l Appln. No. PCT/US2016/064451. 12 Pages.
Notification of Transmittal of the International Search Report and the Written Opinion of the International Searching Authority dated Feb. 16, 2017 re: Int'l Appln. No. PCT/US16/064451. 13 Pages.
Extended European Search Report dated May 8, 2019 re: EP Appln. No. 16871512.6. 8 Pages.

* cited by examiner

DEVICE WITH MULTIPLE ROOTS OF TRUST

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
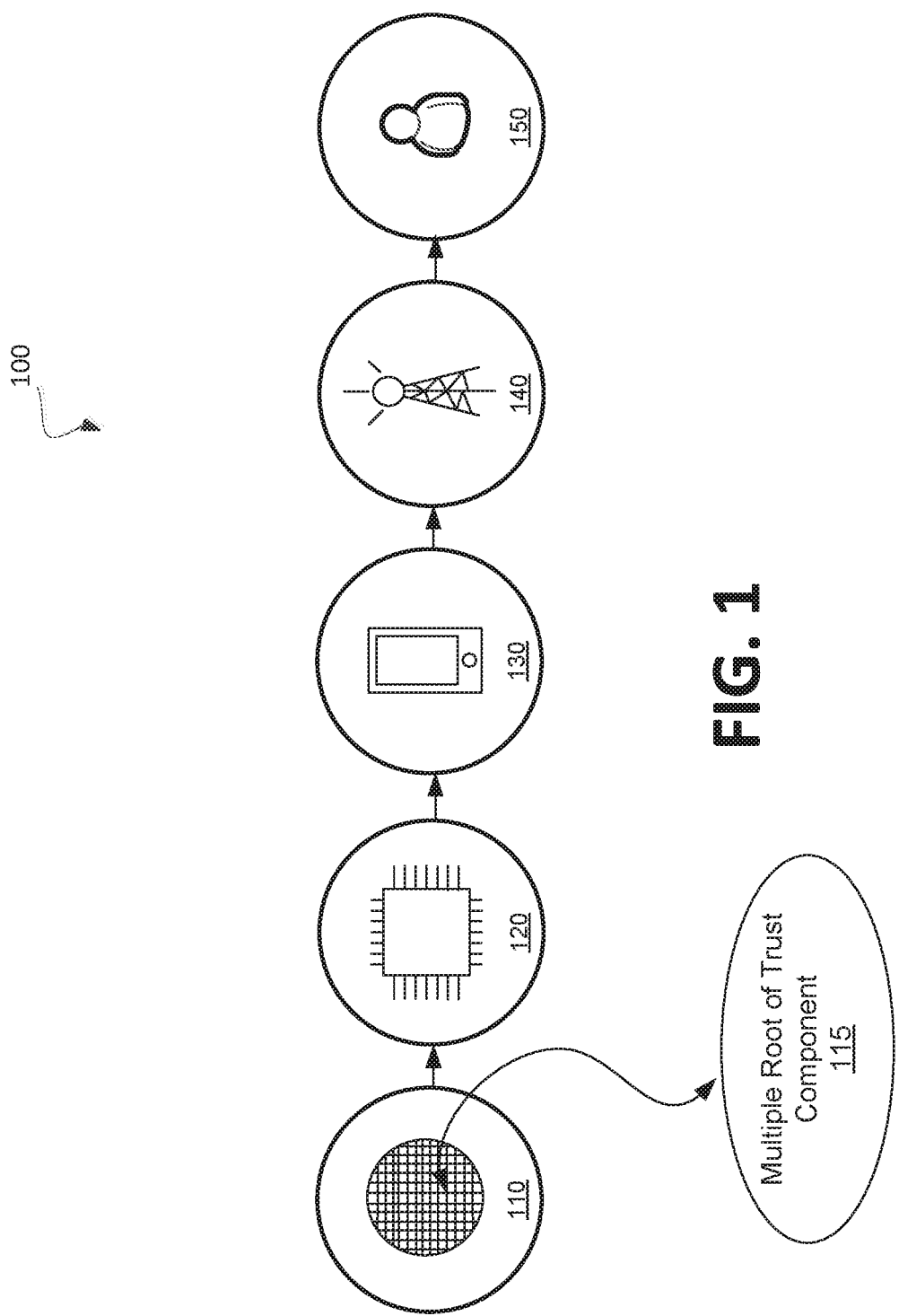
FIG. 1 illustrates an example lifecycle of an integrated circuit or device that includes a multiple root of trust component in accordance with some embodiments.

Aspects of the present disclosure are directed to a device with multiple roots of trust. The device may include an integrated circuit with a multiple root of trust component that provides access to different resources, or features, of the integrated circuit based on different roots of trust. Each of the roots of trust may correspond to a single root entity that represents an entity that is assigned certain permissions or privileges to resources of the integrated circuit. The resources of the integrated circuit may correspond to a functionality or an operation of the integrated circuit. For example, the resources of the integrated circuit may include, but are not limited to, access of certain hardware capabilities of the integrated circuit, access to operational states of the integrated circuit (e.g., a debug state), the writing to a memory of the integrated circuit, access to cryptographic keys or cryptographic operations to generate keys, cryptographic verification operations, network communication features, read and write operations to particular regions of memory, read operations to one-time-programmable memory (OTP), write operations to OTP, read operations to flash, write operations to flash, etc.

Each of the resources of the integrated circuit may be controlled or managed by one of the root entities. For example, a particular root entity may have exclusive privileges to a particular resource that is provided by the integrated circuit. Such privileges may correspond to an authority to manage a particular resource by delegating the resource to a delegate entity (e.g., another entity that does not have exclusive privileges to a resource) or assigning the resource to another root entity. Delegating a resource may refer to providing access or an authorization to access a resource to a delegate entity and assigning a resource may refer to transferring the privileges of a resource from one root entity to another root entity.

The root entities may each correspond to a different cryptographic key that is stored in the integrated circuit. For example, at manufacturing of the integrated circuit, one or more cryptographic keys may be stored in the silicon or interconnect of the integrated circuit. For example, a key corresponding to one of a public-private key pair (e.g., the public key) or a symmetric key may be stored in the interconnect of the integrated circuit. Further root entities (e.g., virtual root entities or virtual root of trust) may be established after the manufacturing of the integrated circuit by programming a one-time programmable (OTP) memory of the integrated circuit. For example, an additional root identification and a corresponding public key of a public-private key pair or a symmetric key for the virtual root entity may be stored in the OTP memory. As described in further detail below, a delegate entity may correspond to a container that is defined by untrusted executable user code that is received after manufacturing of the device. Root entities may delegate resources to a particular container. For example, a first root entity may delegate a first resource and a second resource of an integrated circuit to a particular container and a second root entity may delegate a third resource of the same integrated circuit to the same container. Thus, when the container is executed, the container may access the first resource, the second resource, and the third resource of the integrated circuit that have been delegated to the container. The root entity may delegate a resource by providing a resource delegation container that identifies the particular resource and the container, or delegate container, to which the resource is delegated.

As such, multiple roots of trust, or root entities, may be associated with a single integrated circuit. A first root entity may have privileges to a first group of resources of the integrated circuit and a second root entity may have privileges to a different second group of resources of the integrated circuit. In contrast, if the integrated circuit included a single root entity or single root of trust, only one root entity may have the privileges to all of the resources of the integrated circuit. Thus, if the integrated circuit is manufactured by a first entity (e.g., the root entity) and is included in a device that is assembled by a second entity, the resources of the integrated circuit may still be associated with privileges of the first entity.

Aspects of the present disclosure address the above and other deficiencies by providing a multiple root of trust component to manage different roots of trust of a single integrated circuit. The multiple root of trust component may be manufactured with one or more roots of trust (i.e., a physical root of trust) where an identification of a root of trust and a cryptographic key of the root of trust or root entity is in the silicon or hardware (e.g., defined by the interconnect) of the integrated circuit. A subsequent root of trust (i.e., a virtual root of trust) may be later established by the programming of an OTP memory of the integrated circuit. For example, a root of trust established during the manufacturing of the integrated circuit may assign a resource to the subsequent root of trust. Each of the roots of trust may delegate resources to a delegate container that may represent executable user code. The cryptographic key of the root of trust may be used to verify a signature of a resource delegation container that is received to delegate resources that are associated with privileges of the root of trust. Thus, while different entities may possess or utilize an integrated circuit that includes the multiple root of trust component at different times throughout the lifecycle of the integrated circuit, certain resources of the integrated circuit may remain privileged to a particular root of trust and not privileged to other roots of trust. For example, a resource of an integrated circuit may be privileged to a first root of trust and a second root of trust may thus not be capable of delegating the resource that is privileged to the first root of trust. Accordingly, the first root of trust or root entity may be assured that a particular resource may only be delegated by itself and not another root of trust or root entity.

FIG. 1 illustrates an example lifecycle 100 of an integrated circuit including a multiple root of trust component. In general, the lifecycle 100 illustrates the handling of an integrated circuit that includes a multiple root of trust component 115 through various stages of the lifecycle 100 involving different entities. In some embodiments, the multiple root of trust component 115 of the integrated circuit may manage privileges of resources of the integrated circuit for multiple root entities.

As shown in FIG. 1, the lifecycle 100 may involve various entities utilizing the integrated circuit at various times. For example, a first entity 110 may be a manufacturing entity that manufactures or fabricates the integrated circuit that includes a multiple root of trust component 115. The first entity 110 may manufacture the integrated circuit with cryptographic keys stored in the silicon (e.g., interconnect) where each of the cryptographic keys corresponds to a single root entity provided by the multiple root of trust component 115. Furthermore, the multiple root of trust component 115 may include a memory where a virtual root of trust may be subsequently created. As an example, the first entity 110 may manufacture the integrated circuit with the multiple root of trust component 115 to include a first root entity and a second root entity (e.g., the integrated circuit is manufactured with a first cryptographic key and a second cryptographic key). The lifecycle 100 may include a second entity 120 that is the first root entity. For example, the second entity 120 may be a semiconductor chip packaging provider that receives the integrated circuit from the first entity 110 and produces a semiconductor package for the integrated circuit that includes the multiple root of trust component 115 that provides privileges to one or more resources of the integrated circuit to the second entity 120 that is the first root entity. For example, privileges associated with a subset of the operations or functionality (e.g., stored cryptographic keys or operations to generate cryptographic keys) of the integrated circuit may be provided to the second entity 120. Accordingly, second entity 120 may delegate certain resources of the integrated circuit to a delegate container or assign certain resources to another root entity as described in further detail below.

Referring to FIG. 1, a third entity 130 may receive the semiconductor package that includes the integrated circuit from the second entity. For example, the third entity 130 may be a device manufacturer that includes or incorporates the integrated circuit into an electronics device. The third entity may further be the second root entity that is provided privileges of other resources of the integrated circuit. For example, the multiple root of trust component 115 may include another cryptographic key and an identification of the third entity 130 as the second root entity that has privileges of other resources that are not privileged to the first root entity (e.g., entering into a debug operational state). Thus, the third entity 130 may delegate or assign different resources (as opposed to the first root entity) of the integrated circuit.

Additionally, a fourth entity 140 may interact with the electronics device that includes the integrated circuit. For example, the integrated circuit may be incorporated into a cellular phone or other such mobile device and the fourth entity 140 may be a type of service provider for communications services used by the cellular phone or other service provider enabling online (as well as offline) secure services. The multiple root of trust component may create a virtual root of trust corresponding to the fourth entity 140 in response to the first or second root entity creating another root entity and assigning one or more privileges to resources to the new root entity. For example, privileges to a resource corresponding to identification data of a user of the mobile device may be assigned to the new root identity corresponding to the fourth entity 140. Thus, the fourth entity 140 may delegate or assign resources of the integrated circuit. Furthermore, a fifth entity 150 may be an end user that is in final possession of the electronics device that includes or incorporates the integrated circuit that includes the multiple root of trust component 115. The fifth entity 150 may provide or initiate delegate containers, or executable user code, where root entities may delegate resources of the integrated circuit to the delegate containers. For example, any combination of the first entity 110, second entity 120, third entity 130, or fourth entity 140 may delegate resources that are privileged to the corresponding entity for a delegate container.

Figure 2:
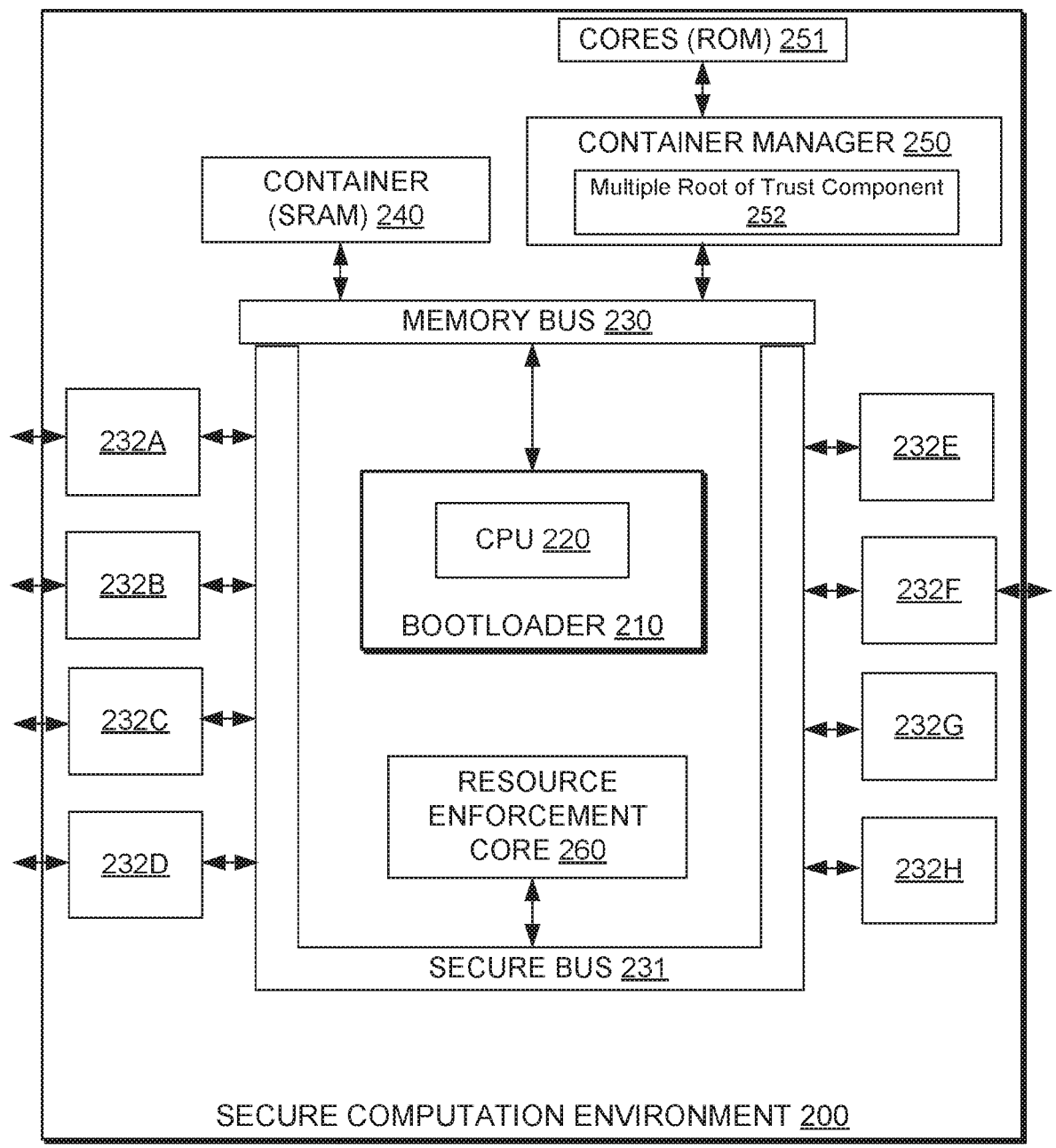
FIG. 2 is a block diagram of an architecture of a device that includes a multiple root of trust component in accordance with some embodiments of the present disclosure.

FIG. 2 is a block diagram of an architecture 200 of a device that includes a multiple root of trust component. In general, the architecture 200 may include a multiple root of trust component 252 that corresponds to the multiple root of trust component 115 of FIG. 1.

As shown in FIG. 2, the architecture 200 may include a bootloader 210 that controls a CPU 220 or other such processing device, a container manager 250 that includes the multiple root of trust component 252 and that is stored in ROM or other memory at manufacturing of an integrated circuit, and a container 240 that is stored in static random access memory (SRAM) or other memory. A memory bus 230 may couple the container 240 and the container manager 250 with the bootloader 210 and other resources 232A-H of the architecture 200.

The bootloader 210 may interact with the container manager 250 that is stored in a read-only memory (ROM) of a device that includes an integrated circuit with the multiple root of trust component 252. The bootloader 210 may be a hardware-based state machine that is executed in response to an initialization (i.e., power-up) of the device. Furthermore, the bootloader 210 may perform a series of power-on self-tests (e.g., a procedure performed immediately after power-on or start up) of the device or integrated circuit. The self tests performed by the bootloader 210 may include a verification or performance test of the hardware components of the integrated circuit. For example, the self-tests may include a test of the CPU or processing device that is part of the integrated circuit. The bootloader 210 may further perform an integrity check of the contents of a ROM of the integrated circuit. For example, the bootloader 210 may perform a verification of the container manager 250 that includes the multiple root of trust component 252 by retrieving the contents of the container manager 250 and computing an integrity check value of the contents. The computed integrity check value may be compared with another stored integrity check value to determine the authenticity or verification of the container manager 250. The integrity check value may correspond to a hash value that is based on a hash function that is used to map digital data of arbitrary size (e.g., the contents of the container manager 250) to digital data of a fixed size (e.g., the computed integrity check value).

After a successful completion of the self-tests, the bootloader 210 may initiate or execute the container manager 250 that includes the multiple root of trust component 252. For example, the bootloader 110 may initiate the container manager 250 after verifying the CPU and the ROM or other memory of the integrated circuit. The control of the CPU or other hardware resources of the integrated circuit may then be provided from the bootloader 210 to the container manager 250. In some embodiments, the container manager 250 may correspond to a trusted embedded light-weight software that provides functionality to hardware resources and other resources of the integrated circuit. For example, the container manager 250 may provide an application programming interface (API) that defines functionalities such as system calls to access features or hardware resources of the integrated circuit. The container manager 250 may further receive one or more containers 240 that correspond to untrusted user code that is received by the integrated circuit. For example, the containers may be received by the integrated circuit after the manufacturing of the integrated circuit. The container manager 250 may verify permissions (e.g., delegated resources) of a received container 240 to access resources of the integrated circuit, verify the authenticity of the received container 240, and provide access to resources of the integrated circuit to the container 240.

The container manager 250 may be executed in response to a receiving of one of the containers 240 or in response to one of the containers 240 executing a system call to access resources of the integrated circuit. After a verification of a received container, the container manager 250 may provide control of the CPU or processing device or another resource of the integrated circuit to the received container. Each of the one or more containers 240 may further correspond to untrusted user code that provides instructions and/or data for accessing resources of the integrated circuit. The containers 240 may be received in a series so that the resources of the integrated circuit are timeshared between the containers 240.

The architecture 200 may include a resource enforcement core 260 that enforces control or access to the resources 232A-H of the architecture 200 based on the multiple root of trust component 252. Such resources may include, but are not limited to, one-time programmable (OTP) memory writes, OTP reads or burns, feature reads, feature writes, reading of cryptographic keys, updating of cryptographic keys, general purpose input/output (GPIO) functions, GPIO writes and reads, an ability to execute code or instructions via or on the CPU 220, access to an executable region of the SRAM, access to a particular portion of any such memory, access to a writable portion of a memory, etc. Other resources may include access to functionality of cores 251 that are stored in ROM. Such cores 251 may correspond to elliptic curve cryptography (ECC) key generation, RSA key generation, or other cryptographic operations to generate keys. In some embodiments, the resource enforcement core 260 may be programmed by the multiple root of trust component 252 of the container manager 250 before the execution of each container 240. For example, a container 240 may include an identification of permissions to the features or resources 232A-H and the container manager 250 may program registers or memory of the resource enforcement core 260 based on the permissions of a container 240 that is to be executed. Thus, the resource enforcement core 260 may enforce access to the resources 232A-H via a secure bus 231 for containers 240 that have been verified by the container manager 250. In some embodiments, one or more of the resources 232A-H may be coupled to external components of a device that includes the architecture 200. For example, a resource 232B may be coupled to another system on a chip (SoC), OTP memory, a random number generator, etc. As described in additional detail below, the containers 240 may include a delegate container, a resource delegation container, and/or a resource assignment container.

As an example, the multiple root of trust component 252 may provide the resource 232A, 232B, 232C, and 232D as privileges to a first root entity, the resources 232E and 232F as privileges to a second root entity, and the resources 232G and 232H as privileges to a third root entity. The first root entity may delegate any combination of the resources 232A-D to a container, also referred to as a delegate container, the second root entity may delegate any combination of the resources 232E and 232F to the delegate container, and the third root entity may delegate any combination of the resources 232G and 232H to the delegate container. Thus, each root entity may include privileges to delegate certain resources of the integrated circuit to a particular delegate container.

Figure 3:
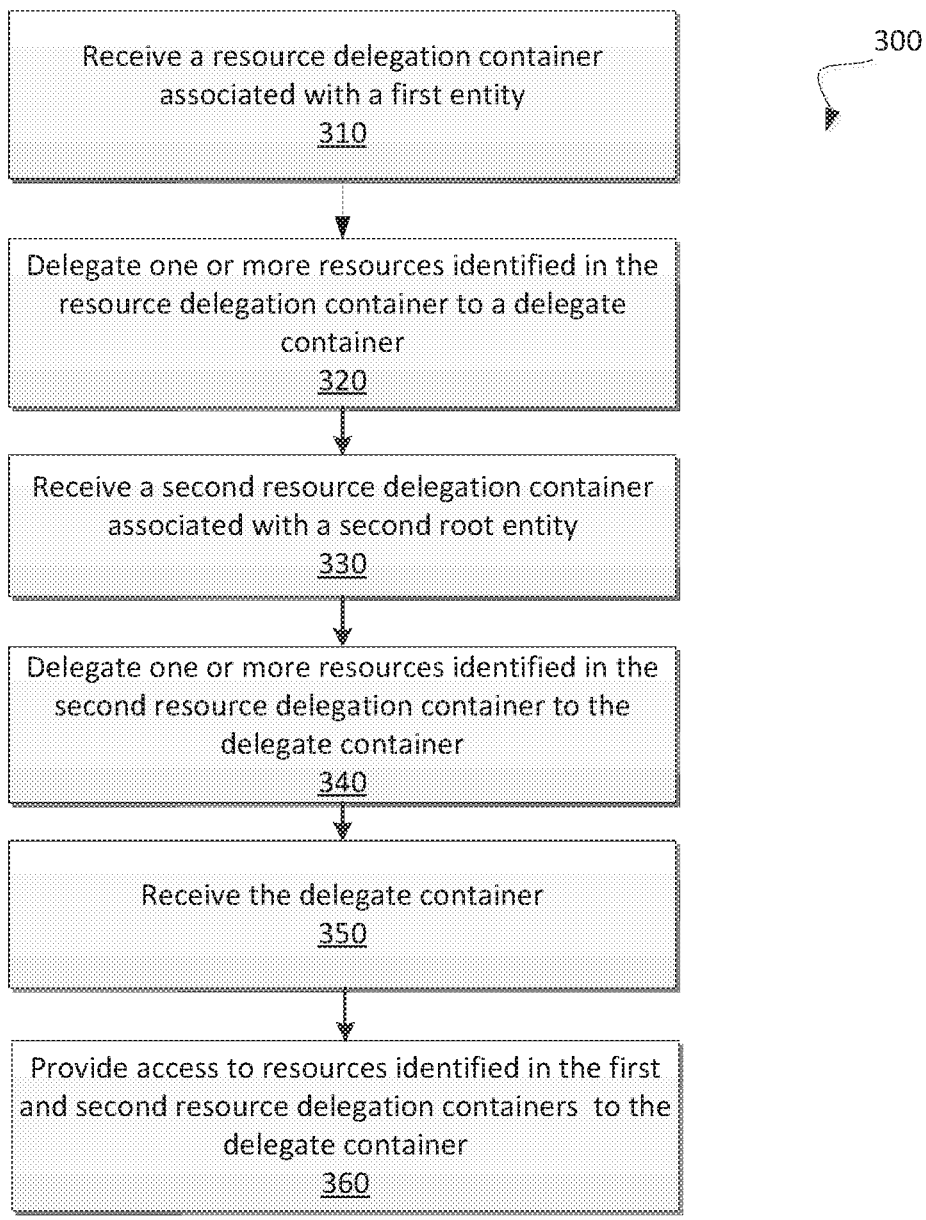
FIG. 3 is a flow diagram of an example method to provide access to resources of an integrated circuit of a device to a delegate container based on resource delegation containers in accordance with some embodiments.

FIG. 3 is a flow diagram of an example method 300 to provide access to resources of an integrated circuit of a device to a delegate container based on resource delegation containers. In general, the method 300 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 300 may be performed by the multiple root of trust component 115 or 252 of FIGS. 1 and 2.

As shown in FIG. 3, the method 300 may begin with the processing logic receiving a resource delegation container associated with a first root entity (block 310). The resource delegation container may be signed by a root entity. Furthermore, the resource delegation container may include instructions to delegate one or more resources that are privileges of a corresponding root entity to a delegate container. Thus, the resource delegation container may identify an operation to delegate a resource and an identification of a particular delegate container. The processing logic may further delegate one or more resources identified in the resource delegation container to a delegation container (block 320). For example, the root entity that has provided the resource delegation container may be identified and the signature of the resource delegation container may be verified based on a cryptographic key that corresponds to the root entity that is retrieved from the integrated circuit. Thus, a resource that is privileged to a first root entity may be delegated to the delegate container after a verification of a resource delegation container that has been signed by the first root entity. The delegation of a resource may correspond to storing delegation information identifying the delegate container and the particular resource delegated to the delegate container in a memory of the integrated circuit. Further details with regard to the storing of delegation information is described in conjunction with FIGS. 5A-5D. The processing logic may subsequently receive a second delegation container associated with a second root entity (block 330). For example, a second delegation container from another root entity that is different than the previous root entity (e.g., the delegation container is signed by a different cryptographic key) may be received. The processing logic may further delegate one or more resources associated with the second root entity to the delegate container that is identified by the second delegation container (block 340). For example, the delegation of the one or more resources may be performed in response to a verification of the signature of the second root entity for the second delegation container by another cryptographic key that is stored at the integrated circuit. The processing logic may subsequently receive the delegate container (block 350) and provide access to the one or more resources from the first resource delegation container associated with the first root entity and the one or more resources from the second delegation container associated with the second root entity to the delegate container (block 360). For example, the delegate container may match the delegate container identified from both the first delegation container and the second delegation container. The delegate container may then be executed and be provided access to the resources from the first and second resource delegation containers.

As such, a first root entity may provide a first resource delegation container and a second root entity may provide a second resource delegation container. The first resource delegation container may delegate at least one resource that is privileged to the first root entity and the second resource delegation container may delegate at least one resource that is privileged to the second root entity. After the first resource delegation container and the second resource delegation container are received and executed, a delegate container that is identified by the first resource delegation container and the second resource delegation container may be received. The delegate container may be allowed to or be provided access to resources that have been delegated from the previous resource delegation containers (e.g., the resource first delegation container and the second resource delegation container).

Figure 4A:
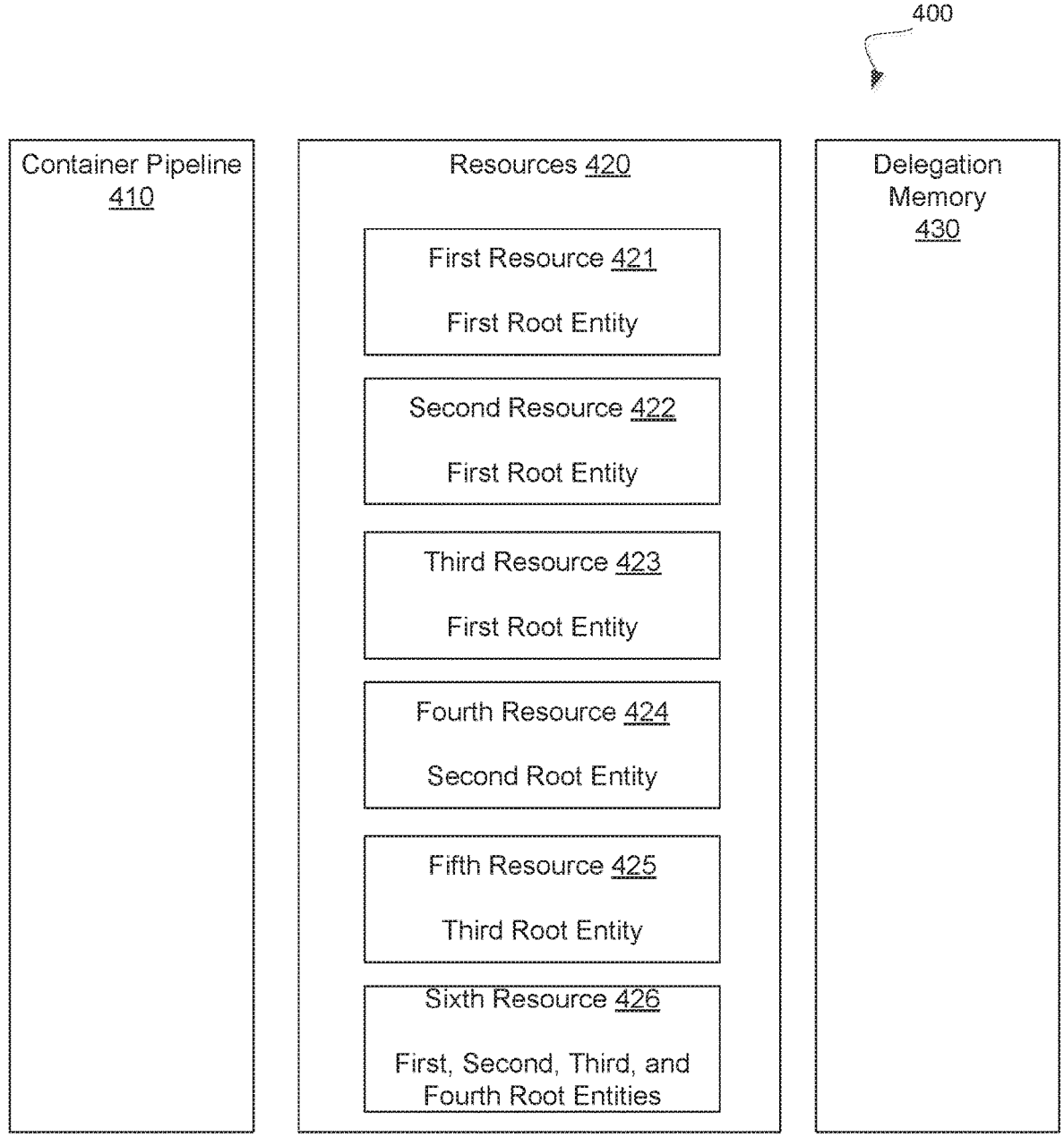
FIG. 4A illustrates an example environment to provide access to resources of an integrated circuit of a device to a delegate container in accordance with some embodiments.

FIG. 4A illustrates an example environment 400 to provide access to resources of an integrated circuit of a device to a delegate container. In general, the environment 400 may correspond to an integrated circuit that includes a multiple root of trust component 115 or 252 of FIGS. 1 and 2.

As shown in FIG. 4A, the environment 400 may include a container pipeline 410, resources 420, and a delegation memory 430. The container pipeline 410 may receive a series of containers. For example, the container pipeline 410 may receive one or more resource delegation containers and a delegate container after the one or more resource delegation containers. The resources 420 may represent resources of an integrated circuit and various root entities with privileges associated with the resources. As shown, a first resource 421 may be associated with a privilege of a first root entity, a second resource 422 may be associated with a privilege of the first root entity, a third resource 423 may be associated with a privilege of the first root entity, a fourth resource 424 may be associated with a privilege of a second root entity, a fifth resource 425 may be associated with a privilege of a third root entity, and a sixth resource 426 may be associated with each of four root entities (e.g., the first, second, third, and a fourth root entity). Furthermore, the delegation memory 430 may include delegation information from resource delegation containers that provide access to at least some of the resources 420 to a delegate container.

Figure 4B:
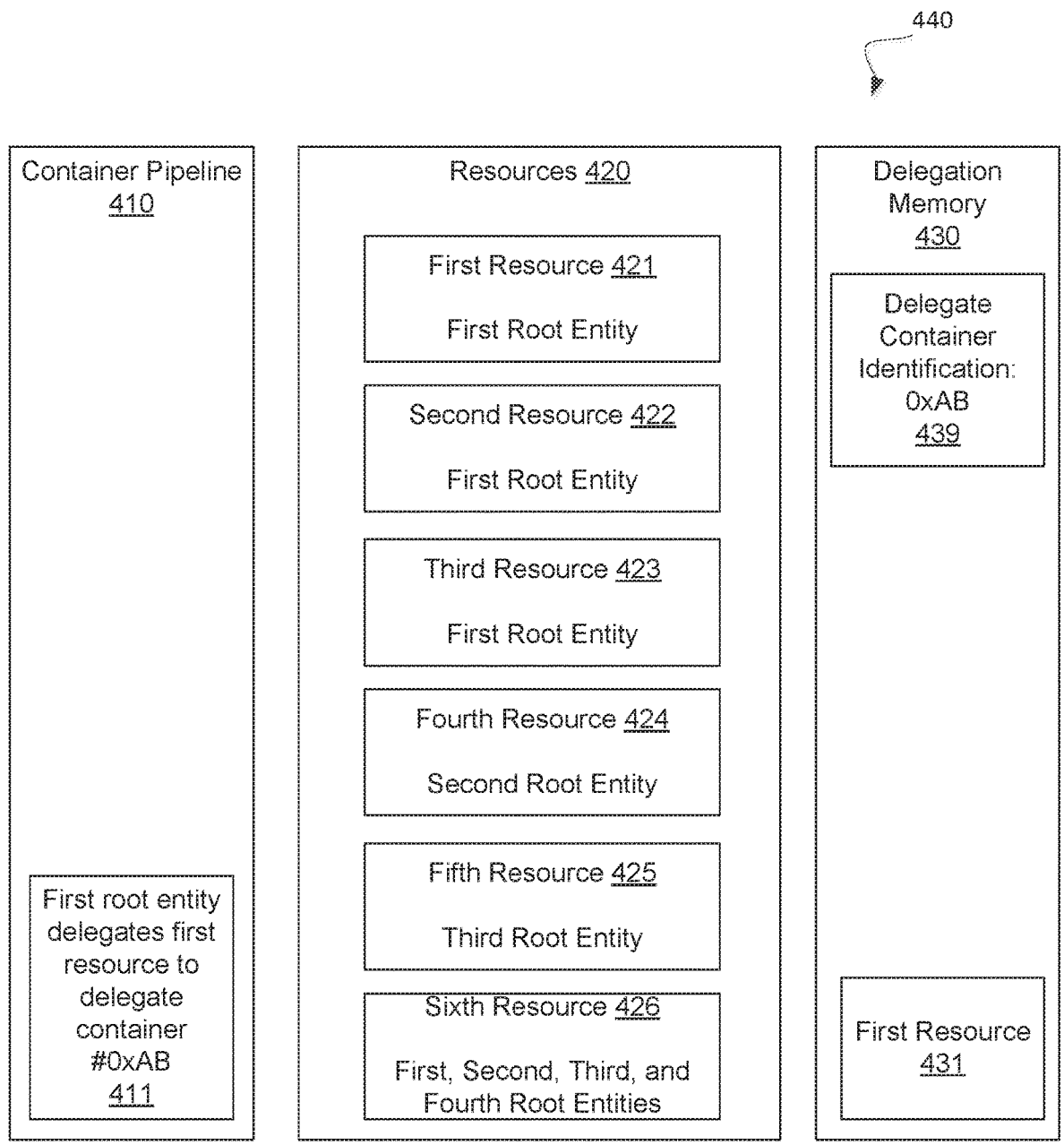
FIG. 4B illustrates an example environment to provide access to resources of an integrated circuit of a device to a delegate container after receiving a resource delegation container in accordance with some embodiments.

FIG. 4B illustrates an example environment 440 to provide access to resources of a device to a delegate container after receiving a resource delegation container. In general, the environment 440 may correspond to the environment 400 of FIG. 4A after the receiving of a resource delegation container.

As shown in FIG. 4B, the container pipeline 410 may receive a first resource delegation container 411 that may identify a delegate container and one or more resources associated with a privilege of the first root entity. For example, the first resource delegation container 411 may include a delegate container identification (e.g., delegate container #0xAB) and the first resource 421 that is managed by the first root entity and that has been delegated to the delegate container. In response to receiving the first resource delegation container 411, the delegation memory 430 may store delegate container identification 439 and an indication 431 of a resource that has been delegated to the delegate container corresponding to the delegate container identification 439. In some embodiments, the first resource delegation container 411 may be signed by a cryptographic key corresponding to the first root entity and may be verified by a corresponding cryptographic key that is stored in the integrated circuit.

In some embodiments, the container identification may be a cryptographic hash of the container. Alternatively, the container identification may be the public key corresponding to the private key used to sign the container. In another embodiment, the container identification may be a hash message authentication code (HMAC). In some embodiments, the container identification may be a combination of the cryptographic hash, public key, or HMAC.

Figure 4C:
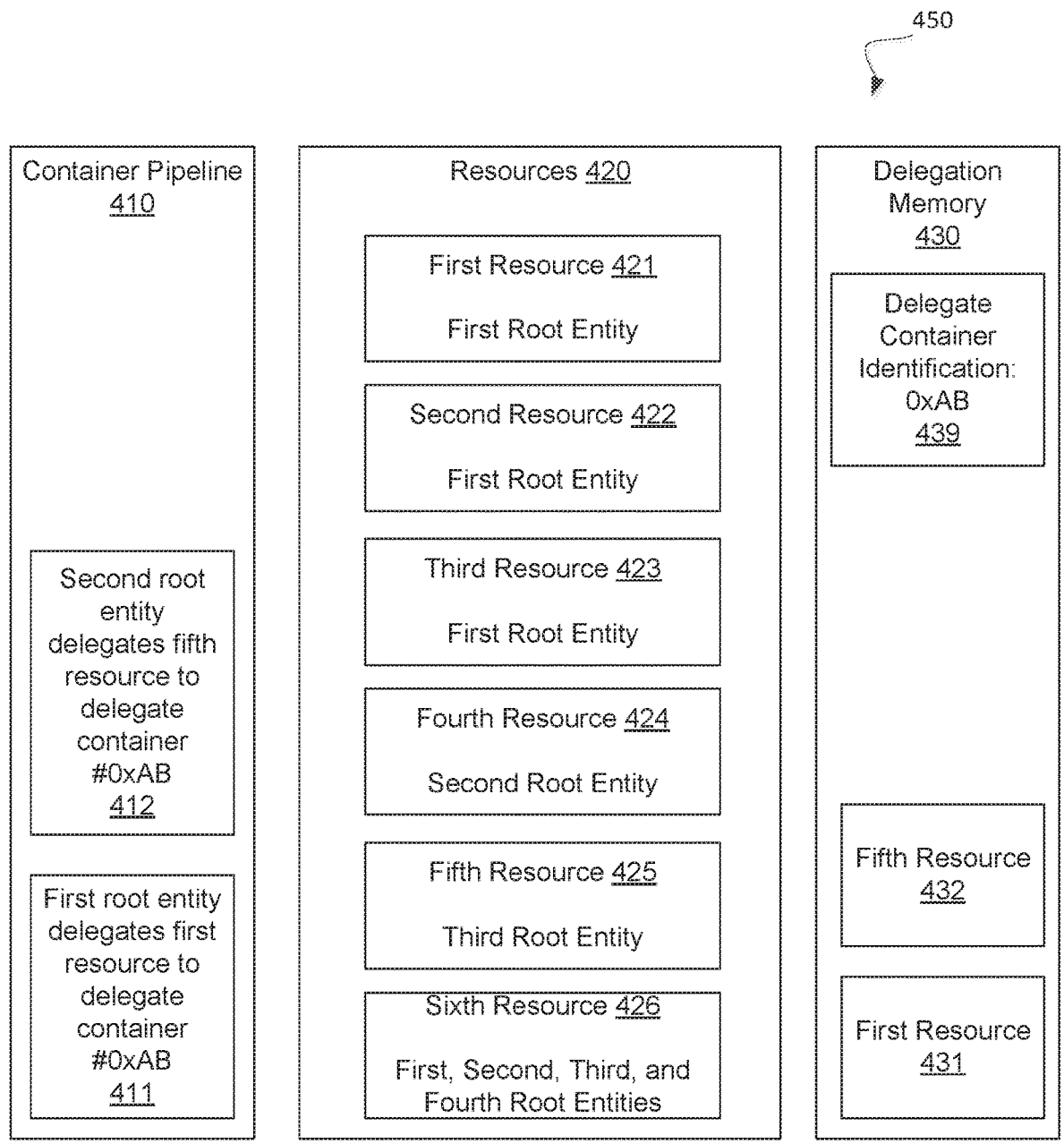
FIG. 4C illustrates an example environment to provide access to resources of an integrated circuit of a device to a delegate container after receiving another resource delegation container in accordance with some embodiments.

FIG. 4C illustrates an example environment 450 to provide access to resources of a device to a delegate container after receiving another resource delegation container. In general, the environment 450 may correspond to the environment 440 of FIG. 4B after the receiving of another resource delegation container.

As shown in FIG. 4C, the container pipeline 410 may receive a second resource delegation container 412 after receiving the first resource delegation container 411. For example, the second resource delegation container 412 may include the same delegate container identification as the first resource delegation container 411 and may identify the fifth resource 425 from the second root entity to the delegate container. As such, the delegation memory 430 may be updated to store additional delegation information in an indication 432 of another resource that has been delegated to the delegate container corresponding to the delegate container identification 439.

Figure 4D:
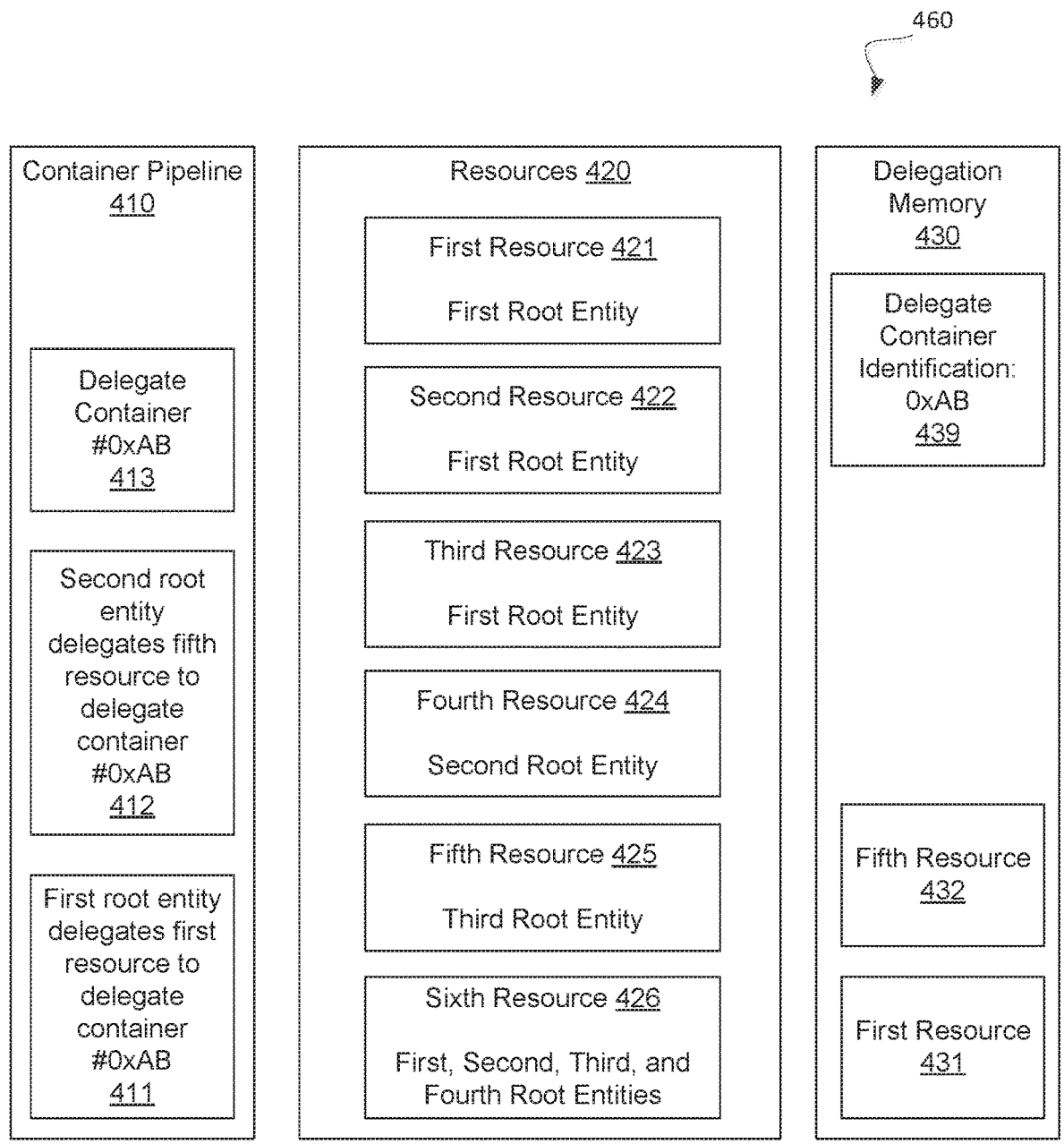
FIG. 4D illustrates an example environment to provide access to resources of an integrated circuit of a device to a delegate container after receiving the delegate container in accordance with some embodiments.

FIG. 4D illustrates an example environment 460 to provide access to resources of a device to a delegate container after receiving the delegate container. In general, the environment 460 may correspond to the environment 450 of FIG. 4C after the receiving of a delegate container.

As shown in FIG. 4D, the container pipeline 410 may receive a delegate container 413. For example, the delegate container with an identification that matches the previous identification of the delegate container from the first resource delegation container 411 and the second resource delegation container 412 may be received. In response to receiving the delegate container 413 and the identification of the delegate container 413 matching the delegate container identification 439 from the delegation memory 430, the delegate container 413 may be provided access to the first resource 421 and the fifth resource 425 that correspond to the indications 431 and 432.

As such, a series of resource delegation containers may be received where each resource delegation container delegates at least one resource to a delegate container. The resource delegation containers may identify the delegate container for which the resources are delegated. In some embodiments, each resource delegation container may identify the same delegate container. In the same or alternative embodiments, if a first resource delegation container identifies a first delegate container and the subsequent second resource delegation container identifies a second delegate container that is different than the first delegate container, then the delegation memory may be reset. For example, after receiving the first resource delegation container identifying the first delegate container, the delegation memory may store information indicating the delegation of the first resource to the first delegate container. If the subsequent second resource delegation container is received and identifies a second delegate container to be delegated a second resource, then the delegate memory may be erased or reset (e.g., the information indicating the delegation of the first resource to the first delegate container is removed) and the delegate memory may store information indicating the delegation of the second resource to the second delegate container. For example, the delegate memory may include the identification of the second delegate container. As such, the delegate memory may store delegation information for a single delegate container.

Figure 5A:
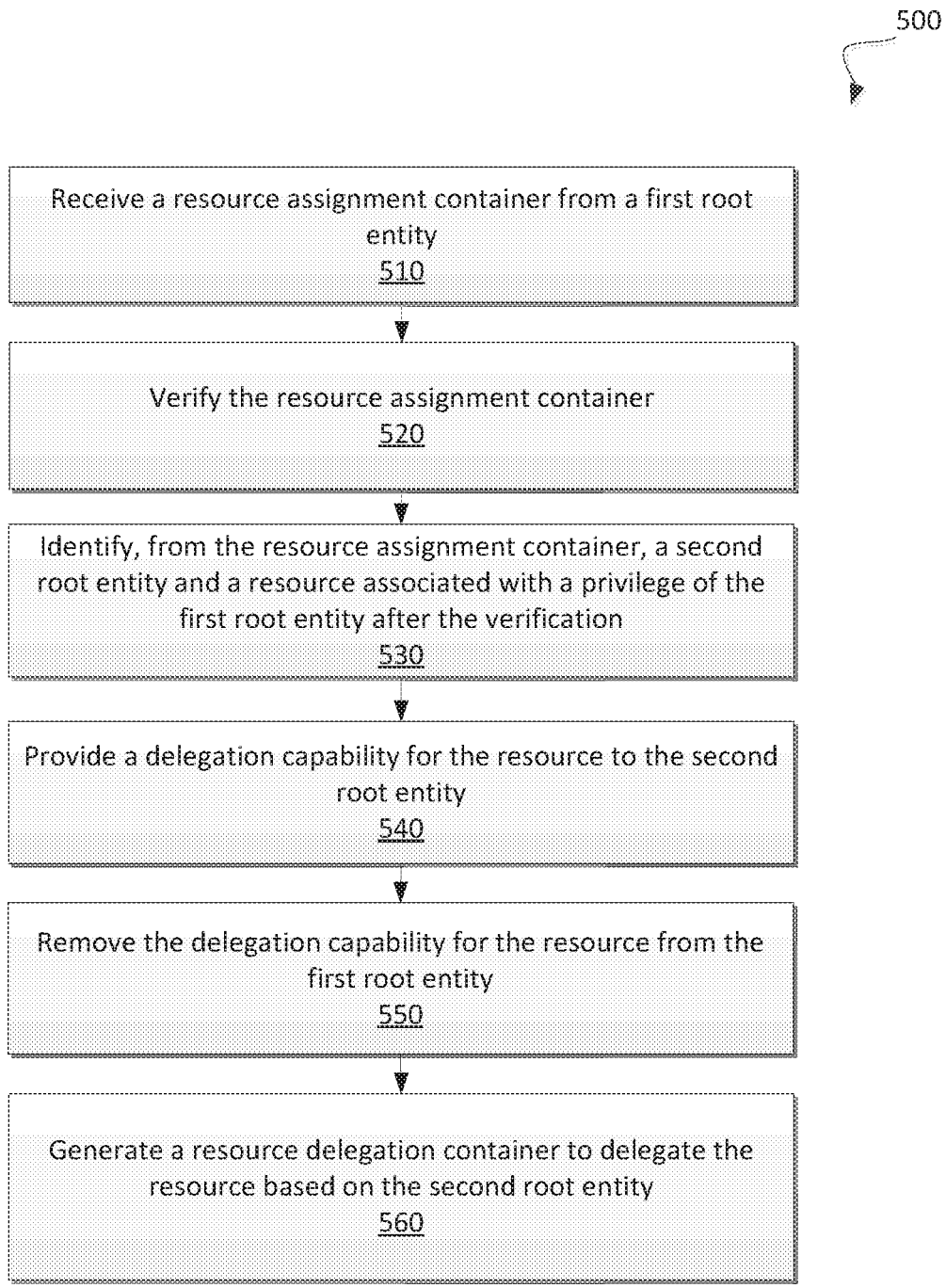
FIG. 5A is a flow diagram of an example method to assign a resource of a device from one root entity to another root entity in accordance with some embodiments.

FIG. 5A is a flow diagram of an example method to assign a resource of a device from one root entity to another root entity. In general, the method 500 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 500 may be performed by the multiple root of trust component 115 or 252 of FIGS. 1 and 2.

As shown in FIG. 5A, the method 500 may begin with the processing logic receiving a resource assignment container from a first root entity (block 510). For example, a resource assignment container may refer to a container that specifies an assignment of a resource of an integrated circuit that is associated with a privilege of a first root entity. The processing logic may subsequently verify the resource assignment container (block 520). For example, a signature of the first root entity that has been used to sign the resource assignment container may be verified by a cryptographic key that corresponds to the first root entity and that is stored in the integrated circuit. Thus, a cryptographic key stored in the integrated circuit that corresponds to the root entity that is assigning the resource may be retrieved to verify the resource assignment container that includes information to assign the resource to another root entity. The processing logic may identify, from the resource assignment container, a second root entity and a resource associated with a privilege of the first root entity after the verification of the resource assignment container (block 530). For example, the resource may correspond to a resource of the integrated circuit that is to be assigned from the first root entity to the second root entity. The processing logic may provide a delegation capability for the resource to the second root entity (block 540) and may remove the delegation capability for the resource from the first root entity (block 550). For example, a memory (e.g., an OTP memory) of the integrated circuit may be modified to store assignment data that identifies that the resource has been assigned from the first root entity to the second root entity. Further details with regard to the assignment data are described in conjunction with FIGS. 6A-7. Furthermore, the processing logic may generate a resource delegation container to delegate the resource based on the second root entity (block 560). For example, a resource delegation container that is signed by a cryptographic key that corresponds to the second root entity may be used to delegate the resource to a delegate container. A resource delegation container that is signed by another cryptographic key that corresponds to the first root entity may no longer be used to delegate the resource to the delegate container after the assignment of the resource from the first root entity to the second root entity.

Figure 5B:
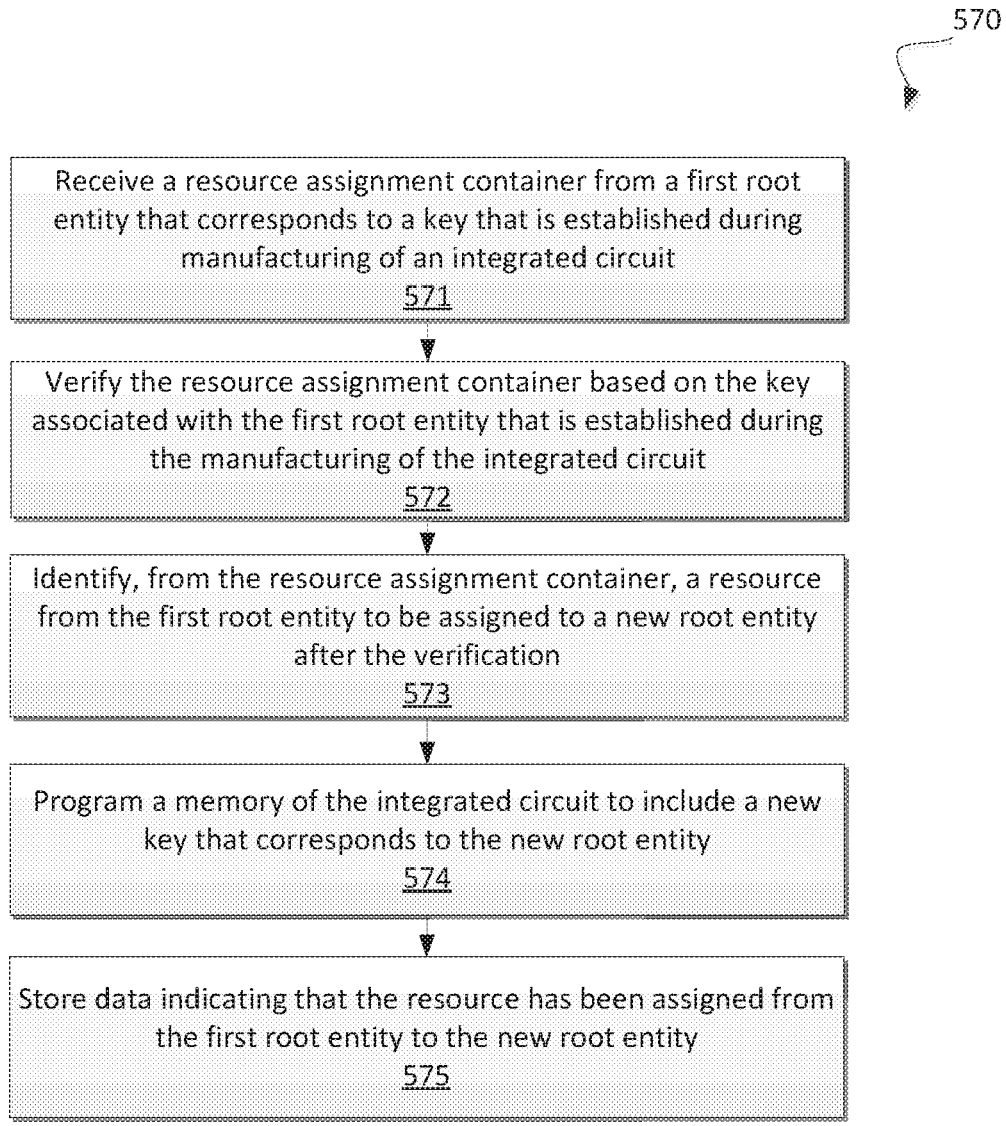
FIG. 5B is a flow diagram of an example method to create a new root entity in accordance with some embodiments.

FIG. 5B is a flow diagram of an example method 570 to create a new root entity. In general, the method 500 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 570 may be performed by the multiple root of trust component 115 or 252 of FIGS. 1 and 2.

As shown in FIG. 5B, the method 570 may begin with the processing logic receiving a resource assignment container from a first root entity where the first root entity corresponds to a key that is established during the manufacturing of an integrated circuit (block 571). As such, a key of the first root entity may be stored in the interconnect or a memory of the integrated circuit at the time of manufacturing of the integrated circuit. The processing logic may verify the resource assignment container based on the key associated with the first root entity that is established during the manufacturing of the integrated circuit (block 572). For example, a signature of the resource assignment container may be verified as originating from the first root entity by using the key corresponding to the first root entity and that was established during the manufacturing of the integrated circuit. The processing logic may identify, from the resource assignment container, a resource from the first root entity that is to be assigned to a new root entity after the verification of the resource assignment container (block 573). For example, the new root entity may not be currently associated or assigned to any key that is stored in the integrated circuit. In response to identifying the new root entity, the processing logic may program a memory of the integrated circuit to include a new key that corresponds to the new root entity (block 574). For example, a new key may be generated (e.g., via a resource of the integrated circuit) and programmed or stored into an OTP memory where the new key is used to verify signatures from subsequent containers associated with the new root entity. Furthermore, the processing logic may store data indicating that the resource has been assigned from the first root entity to the new root entity (block 575). For example, as described in further detail with regard to FIGS. 6A-6D, a resource update memory may store information indicating the assignment of the first resource to the new root entity.

Figure 6A:
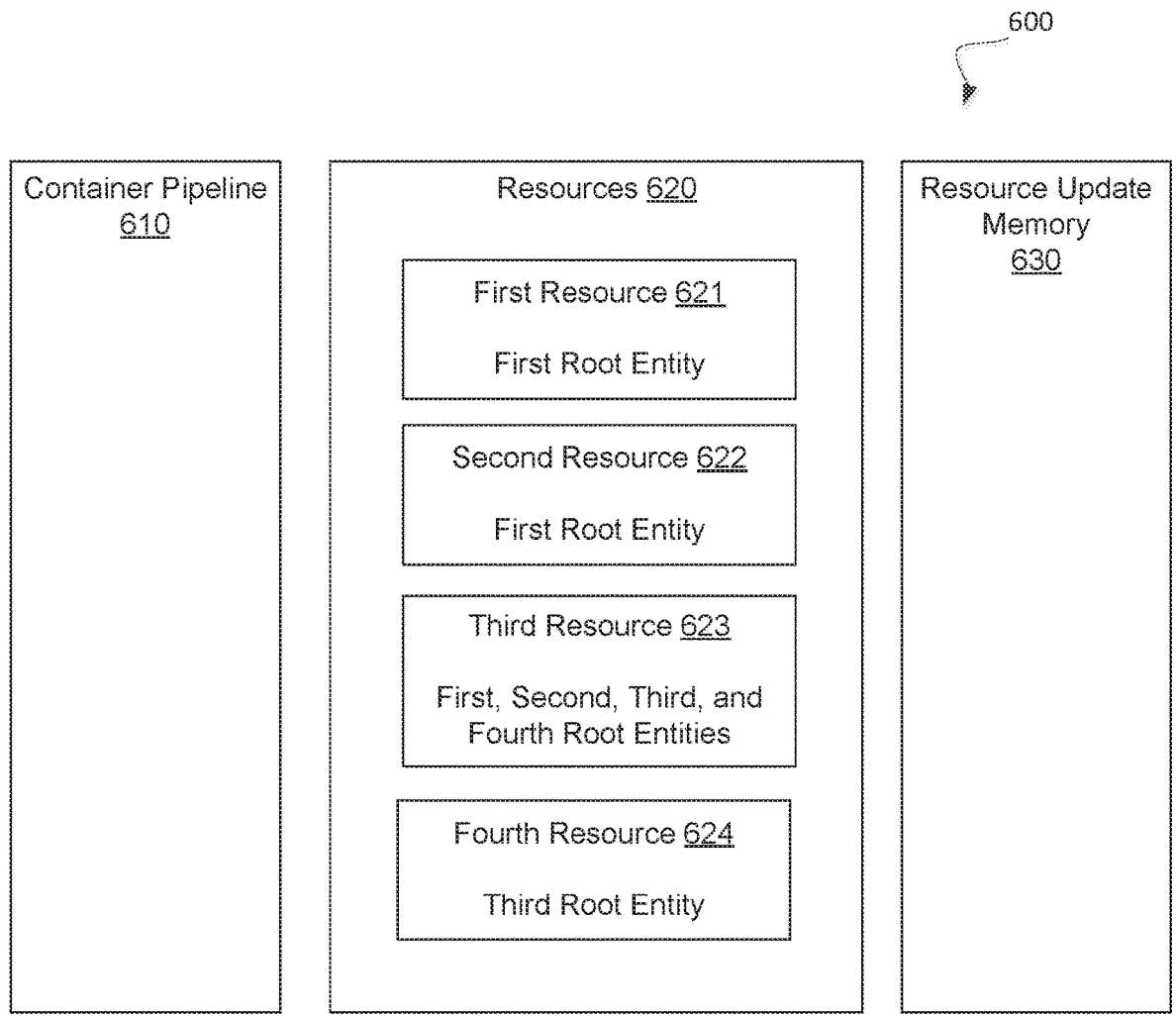
FIG. 6A illustrates an example environment to assign resources of a device to another root entity in accordance with some embodiments.

FIG. 6A illustrates an example environment 600 to assign resources of a device to another root entity. In general, the environment 600 may correspond to an integrated circuit that includes a multiple root of trust component 115 or 252 of FIGS. 1 and 2.

As shown in FIG. 6A, the environment 600 may include a container pipeline 610, resources 620, and a resource update memory 630. As previously described, the container pipeline may receive a series of containers. For example, one or more resource assignment containers, resource delegation containers, and delegate containers may be received in a series. The resources 620 may represent default root entities for particular resources of the integrated circuit. For example, the resources 620 may be based on the interconnect of the integrated circuit or a memory (e.g., an OTP memory) that identifies a default root entity (e.g., the root entity at manufacturing of the integrated circuit) for a particular resource. As shown, a first resource 621 of the integrated circuit may be associated with a first root entity, the second resource 622 may be associated with the first root entity, the third resource 623 may be associated with each of the first, second, third, and fourth root entities, and a fourth resource 624 may be associated with a third root entity. Furthermore, the resource update memory 630 may be a one-time programmable (OTP) memory that is used to store assignment information that identifies when one of the resources 620 has been assigned from a default root entity to another root entity. Thus, the resource update memory 630 may be updated in response to a resource assignment container that is received from the container pipeline 610. The resource update memory 630 may be further used in response to the container pipeline 610 receiving a resource delegation container as described in further detail with regard to FIG. 7.

Figure 6B:
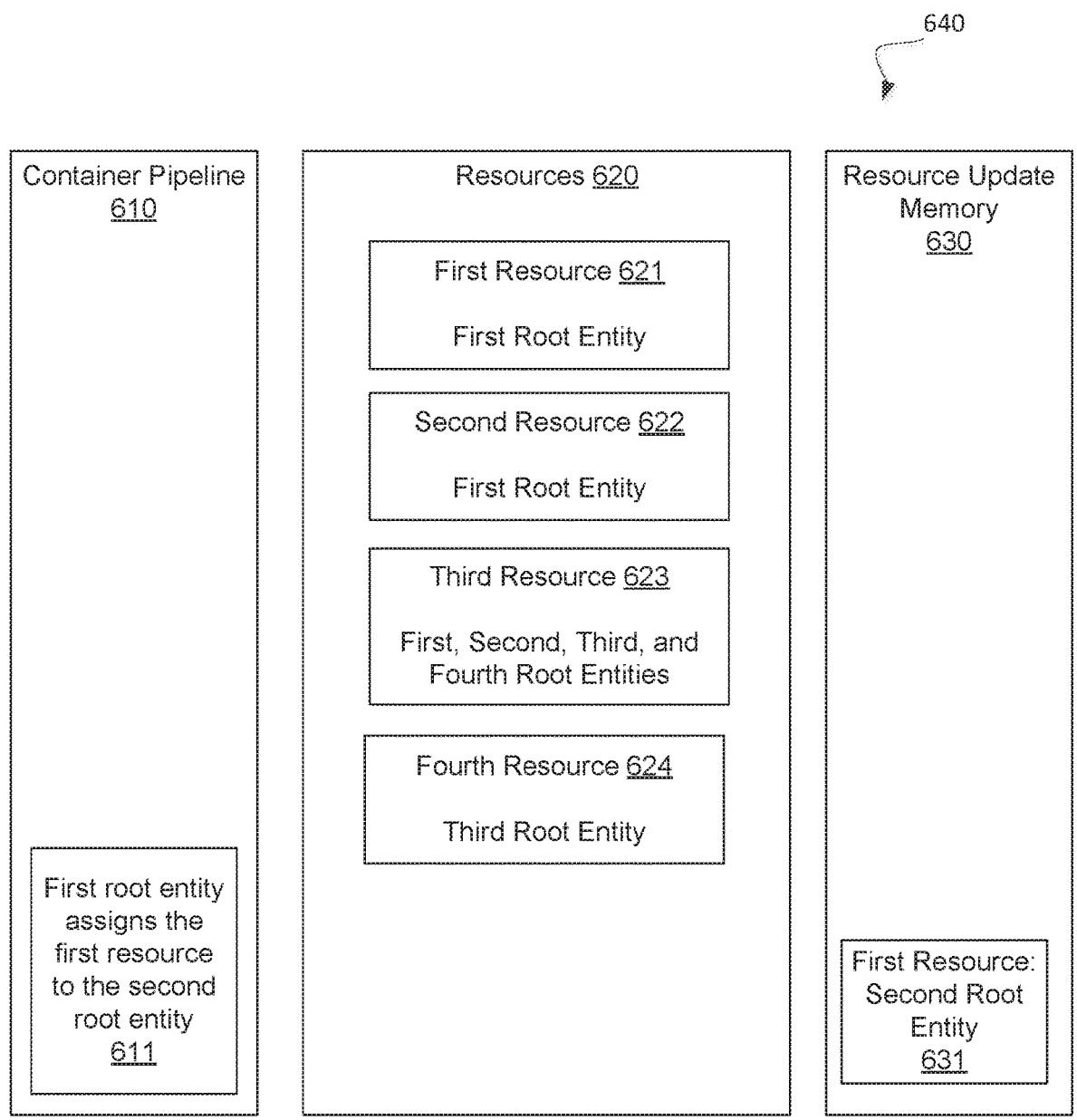
FIG. 6B illustrates an example environment to assign resources of a device to another root entity after receiving a resource assignment container in accordance with some embodiments.

FIG. 6B illustrates an example environment 640 to assign resources of a device to another root entity after receiving a resource assignment container. In general, the environment 640 may correspond to the environment 600 of FIG. 6A after the receiving of a resource assignment container.

As shown in FIG. 6B, the container pipeline 610 may receive a first resource assignment container 611 that may identify a first root entity, a second root entity, and a particular resource of the integrated circuit. For example, the first resource assignment container 611 may identify that the first resource 621 of the integrated circuit may be assigned from the first root entity (e.g., the default root entity) to the second root entity. In response to a verification of a signature of the first resource assignment container 611 by the first root entity (e.g., by a cryptographic key that corresponds to the first root entity), first resource assignment information 631 may be stored in the resource update memory 630. The first resource assignment information 631 may identify that the first resource 621 has been assigned from the default first root entity to a second root entity. Thus, the first resource assignment information 631 may store information that identifies when a particular resource has been assigned from its default root entity.

Figure 6C:
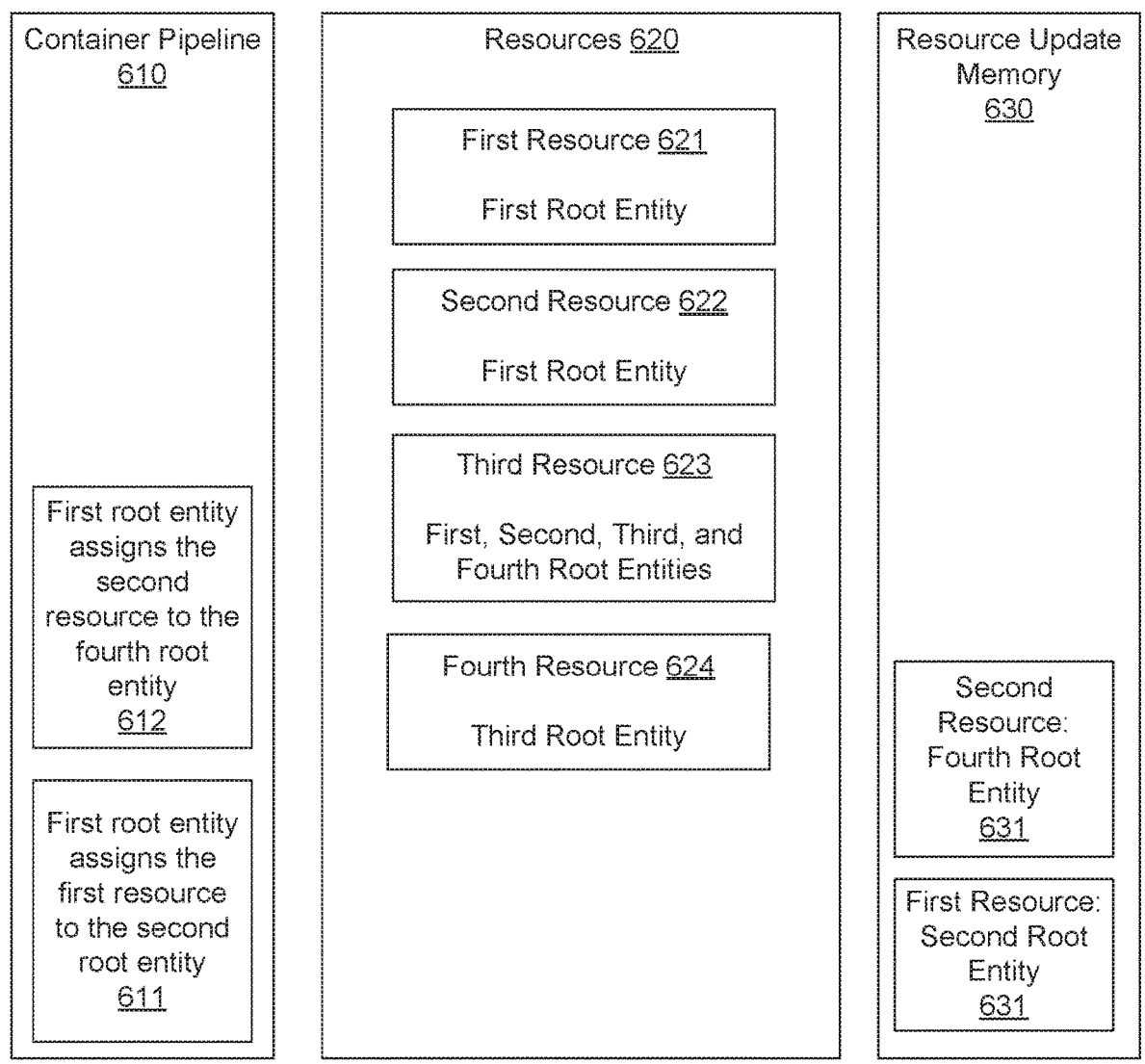
FIG. 6C illustrates an example environment to assign resources of a device to another root entity after receiving another resource assignment container in accordance with some embodiments.

FIG. 6C illustrates an example environment 650 to assign resources of a device to another root entity after receiving another assignment container. In general, the environment 650 may correspond to the environment 640 of FIG. 6B after the receiving of another assignment delegation container.

As shown in FIG. 6C, the container pipeline 610 may receive a second resource assignment container 612 that may identify that the second resource 622 of the integrated circuit may be assigned from the first root entity (e.g., the default root entity) to the fourth root entity. In response to a verification of a signature of the second resource assignment container 612, second resource assignment information 632 may be stored in the resource update memory 630. The second resource assignment information 632 may identify that the second resource 622 has been assigned from the default first root entity to the fourth root entity. Thus, the second resource assignment information 631 may store information that identifies that an additional resource has been assigned from its default root entity corresponding to the first root entity.

Figure 6D:
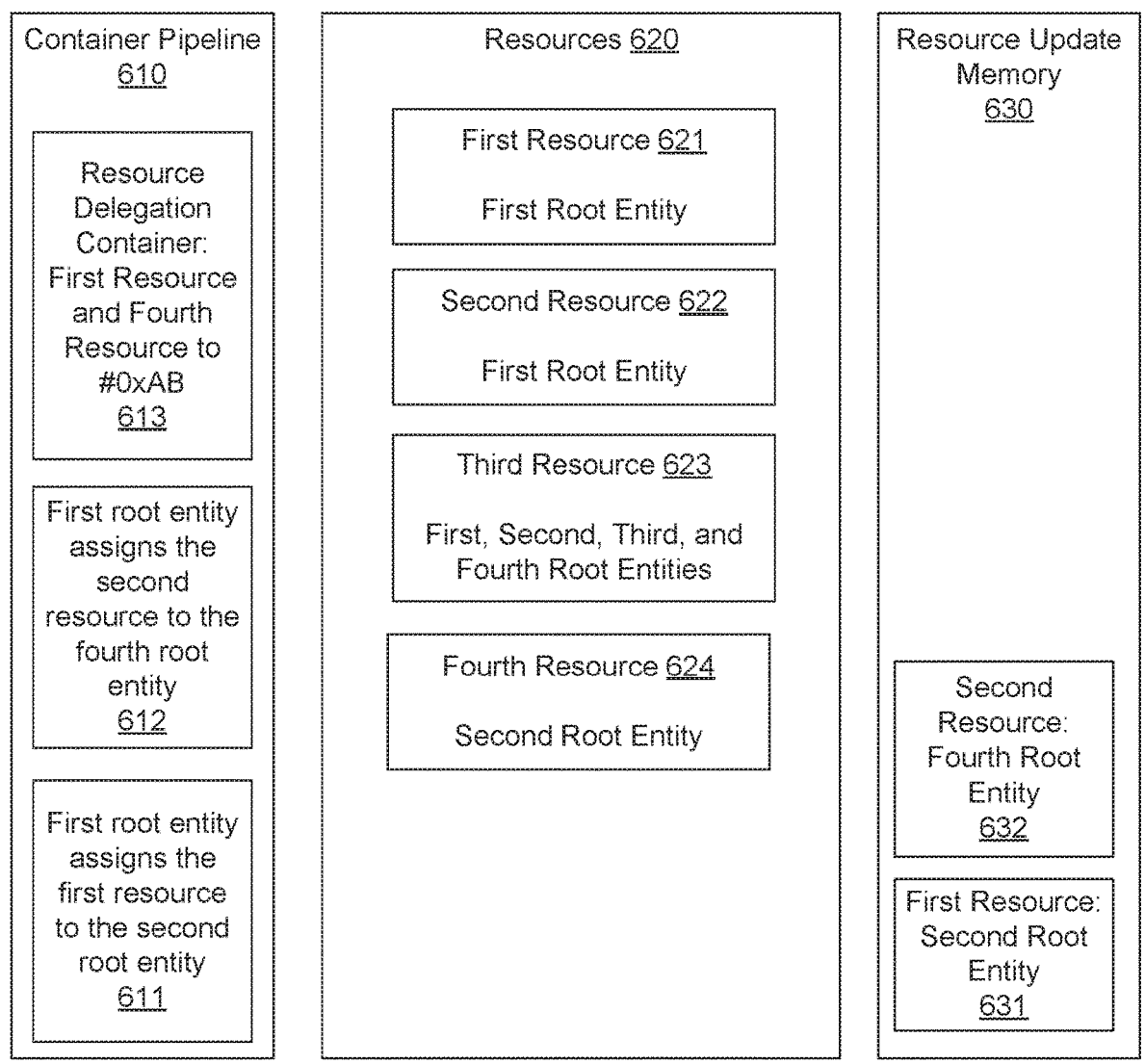
FIG. 6D illustrates an example environment to provide access to resources of a device based on assigned resources in accordance with some embodiments.

FIG. 6D illustrates an example environment 660 to provide access to resources of a device based on assigned resources. In general, the environment 660 may correspond to the environment 650 of FIG. 6C after the receiving of a resource delegation container.

As shown in FIG. 6D, the container pipeline 610 may receive a resource delegation container 613 that may identify that a delegation of the first resource 621 and the fourth resource 624 to a particular delegate container with an identification of '0xAB.' As shown, the fourth resource 624 is associated with, or assigned, to the second root entity (e.g., the second root entity is the default root entity of the fourth resource 624). Furthermore, the first resource 621 is associated with a default root entity as the first root entity, but the first root entity has assigned the first resource 621 to the second root entity. For example, the resource update memory 630 includes the first resource assignment information 631 that identifies that the first resource 621 has been assigned from the first root entity to the second root entity. Thus, the second root entity may be associated with privileges to further delegate the fourth resource 624 for which the second root entity is the default root entity as well as the first resource 621 for which the first root entity has assigned to the second root entity. Since the resource delegation container 613 includes information to delegate the first resource 621 and the fourth resource 624 that are each privileges associated with the second root entity, a signature of the resource delegation container 613 may be verified based on a cryptographic key corresponding to the second root entity. If the signature is determined to be valid, then the first resource 621 and the fourth resource 624 may be delegated to the container that is identified in the resource delegation container 613.

Figure 7:
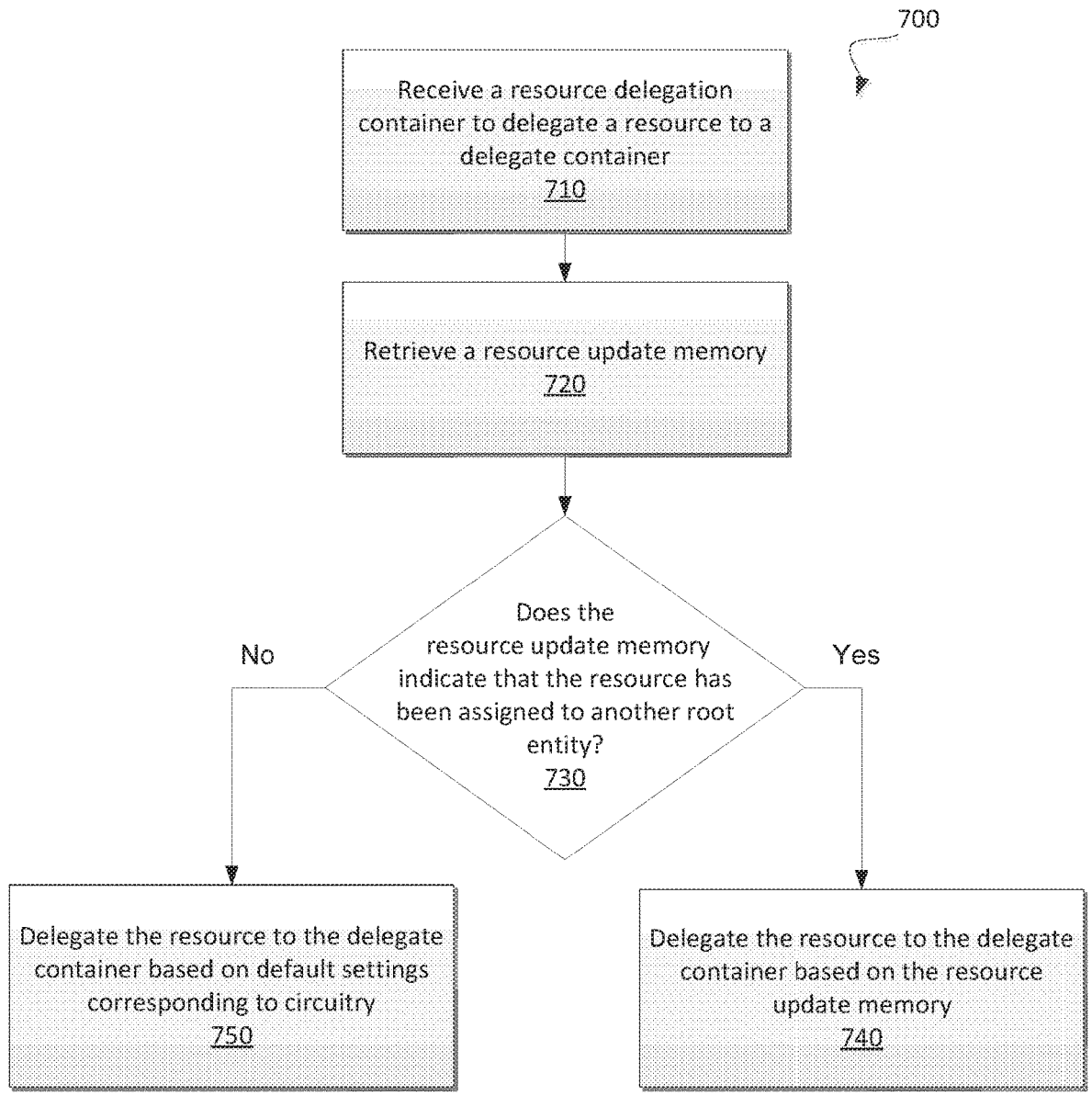
FIG. 7 is a flow diagram of an example method to assign a resource of a device from one root entity to another root entity based on data stored in a memory in accordance with some embodiments.

FIG. 7 is a flow diagram of an example method 700 to assign a resource of a device from one root entity to another root entity based on data stored in a memory. In general, the method 700 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 700 may be performed by the multiple root of trust component 115 or 252 of FIGS. 1 and 2.

As shown in FIG. 7, the method 700 may begin with the processing logic receiving a resource delegation container to delegate a resource to a delegate container (block 710). For example, the resource delegation container may be received from a root entity to delegate a resource that is privileged to the root entity. The processing logic may further retrieve a resource update memory in response to receiving the resource delegation container (block 720). For example, resource assignment information from a memory of an integrated circuit may be retrieved. The processing logic may subsequently determine whether the resource update memory indicates that the resource has been assigned to another root entity (block 730). For example, the resource assignment information may identify whether a particular resource of the integrated circuit has been assigned to another root entity from a corresponding default root entity. If the resource update memory indicates that the resource has not been assigned to another root entity (e.g., the resource identified in the resource delegation container is not identified in the resource assignment information), then the processing logic may delegate the resource to the delegate container based on default settings corresponding to circuitry (e.g., interconnect) (block 750). For example, a cryptographic key that is stored in the integrated circuit and that corresponds to the default root entity for the resource may be used to verify the resource delegation container. However, if the resource update memory indicates that the resource has been assigned to another root entity (e.g., the resource identified in the resource delegation container is identified in the resource assignment information), then the processing logic may delegate the resource to the delegate container based on the resource update memory (block 740). For example, a different cryptographic key that is stored in the integrated circuit and that corresponds to a different root entity (e.g., not the default root entity) for the resource may be used to verify the resource delegation container.

Figure 8:
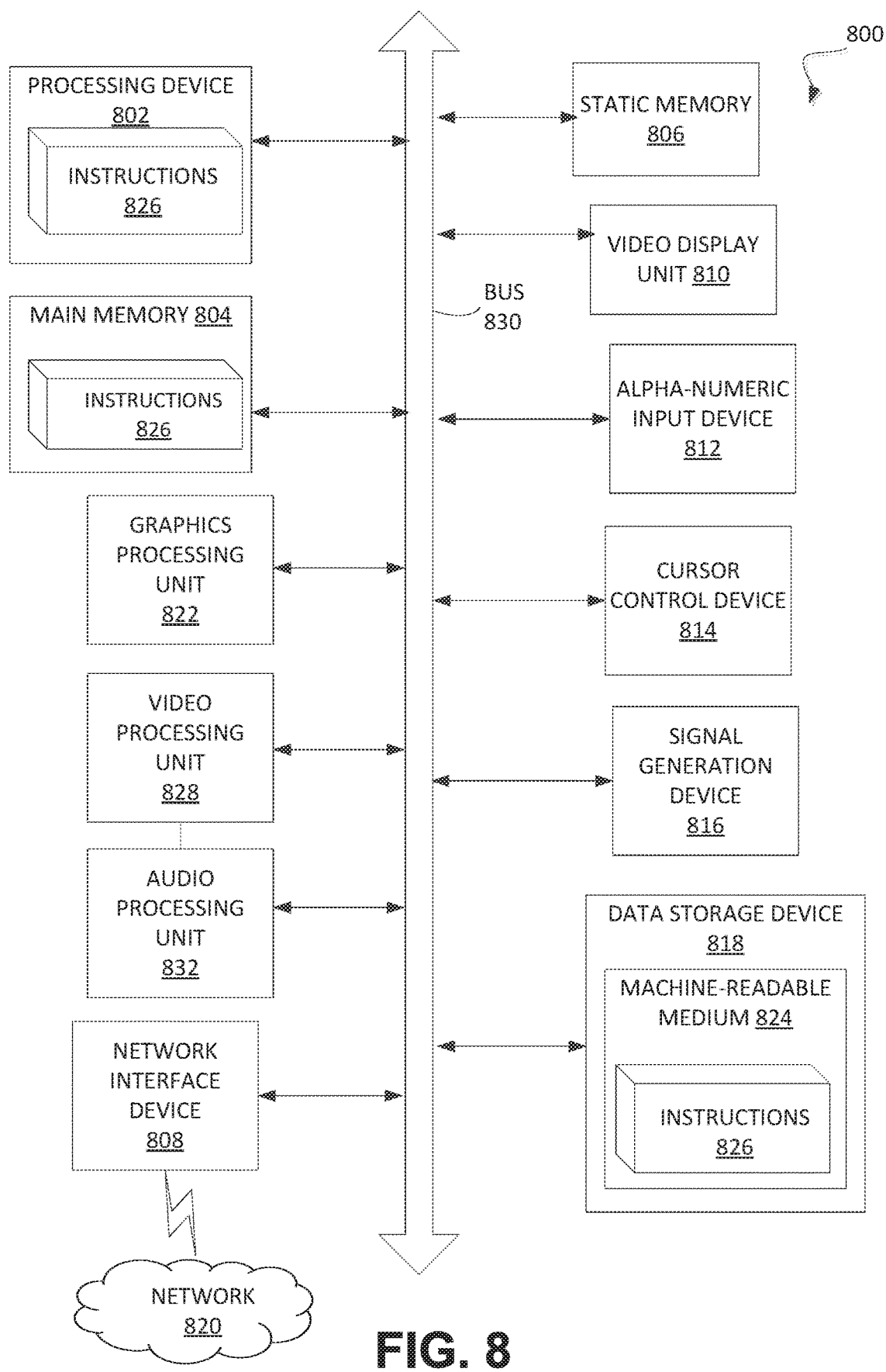
FIG. 8 illustrates a block diagram of an embodiment of a computer system in which some embodiments of the disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 1008. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, and a signal generation device 816 (e.g., a speaker).

The data storage device 818 may include a machine-readable storage medium 824 (also known as a computer-readable medium) on which is stored one or more sets of instructions or software 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In one implementation, the instructions 826 include instructions to implement functionality corresponding to a multiple root of trust component (e.g., multiple root of trust component 115 of FIG. 1 or the multiple root of trust component 252 of FIG. 2). While the machine-readable storage medium 828 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    receiving a container from a first root of trust associated with a first root entity, wherein the container corresponds to a mapping of a resource of an integrated circuit that is associated with the first root entity;
    verifying the container based on a key that corresponds to the first root of trust and that is stored in the integrated circuit at manufacturing of the integrated circuit;
    identifying that an assignment of the resource of the integrated circuit from the container corresponds to assigning the resource from the first root of trust to a new root of trust associated with a second root entity, wherein the first root of trust and the new root of trust are associated with the integrated circuit, wherein the second root entity has privileges to a different group of resources than the first root entity;
    generating a new key corresponding to the new root of trust;
    storing information corresponding to the new key for the new root of trust into a memory of the integrated circuit; and
    using, by a processing device, the new key corresponding to the new root of trust to delegate the resource of the integrated circuit to a subsequent container.

2. The method of claim 1, wherein the using of the new key to delegate the resource of the integrated circuit to the subsequent container comprises:
    receiving the subsequent container; and
    determining whether a signature of the subsequent container corresponds to the new root of trust based on the new key.

3. The method of claim 2, wherein the using of the new key to delegate the resource of the integrated circuit to the subsequent container further comprises:
    delegating the resource to the subsequent container in response to a verification of the signature of the subsequent container as being associated with the new root of trust based on the new key.

4. The method of claim 1, wherein the key that corresponds to the first root of trust is stored by interconnect of the integrated circuit and the new key is stored in a one-time programmable (OTP) memory of the integrated circuit.

5. The method of claim 1, wherein the storing information corresponding to the new key for the new root of trust into the memory of the integrated circuit comprises:
    storing, in the memory, an identification of the resource being assigned to the new root of trust from the first root of trust and being removed from an association with the first root of trust.

6. The method of claim 5, further comprising:
    receiving the subsequent container;
    identifying that the subsequent container corresponds to a delegation of the resource; and
    verifying the subsequent container based on the identification of the resource in the memory.

7. The method of claim 1, wherein the container and subsequent container correspond to executable code.

8. A system comprising:
    a memory storing computer executable code; and
    a processing device operatively coupled with the memory to execute the computer executable code to:
    receive a container from a first root of trust associated with a first root entity, wherein the container corresponds to a mapping of a resource of an integrated circuit that is associated with the first root entity;
    verify the container based on a key that corresponds to the first root of trust and that is stored in the integrated circuit at manufacturing of the integrated circuit;
    identify that an assignment of the resource of the integrated circuit from the container corresponds to assigning the resource from the first root of trust to a new root of trust associated with a second root entity, wherein the first root of trust and the new root of trust are associated with the integrated circuit, wherein the second root entity has privileges to a different group of resources than the first root entity;
    generate a new key corresponding to the new root of trust;

store information corresponding to the new key for the new root of trust into a memory of the integrated circuit; and use the new key corresponding to the new root of trust to delegate the resource of the integrated circuit to a subsequent container.

9. The system of claim 8, wherein the using of the new key to delegate the resource of the integrated circuit to the subsequent container comprises:

receiving the subsequent container; and determining whether a signature of the subsequent container corresponds to the new root of trust based on the new key.

10. The system of claim 9, wherein the using of the new key to delegate the resource of the integrated circuit to the subsequent container further comprises:

delegating the resource to the subsequent container in response to a verification of the signature of the subsequent container as being associated with the new root of trust based on the new key.

11. The system of claim 8, wherein the key that corresponds to the first root of trust is stored by interconnect of the integrated circuit and the new key is stored in a one-time programmable (OTP) memory of the integrated.

12. The system of claim 8, wherein the storing information corresponding to the new key for the new root of trust into the memory of the integrated circuit comprises:

storing, in the memory of the integrated circuit, an identification of the resource being assigned to the new root of trust from the first root of trust and being removed from an association with the first root of trust.

13. The system of claim 12, wherein the processing device is further to execute the computer executable code to:

receive the subsequent container;

identify that the subsequent container corresponds to a delegation of the resource; and verify the subsequent container based on the identification of the resource in the memory of the integrated circuit.

14. The system of claim 8, wherein the container and the subsequent container correspond to executable code.

15. A non-transitory computer readable medium including data that, when accessed by a processing device, cause the processing device to perform operations comprising:

receiving a container from a first root of trust associated with a first root entity, wherein the container corresponds to a mapping of a resource of an integrated circuit that is associated with the first root entity;

verifying the container based on a key that corresponds to the first root of trust and that is stored in the integrated circuit at manufacturing of the integrated circuit;

identifying that an assignment of the resource of the integrated circuit from the container corresponds to assigning the resource from the first root of trust to a new root of trust associated with a second root entity, wherein the first root of trust and the new root of trust are associated with the integrated circuit, wherein the second root entity has privileges to a different group of resources than the first root entity;

generating a new key corresponding to the new root of trust;

storing information corresponding to the new key for the new root of trust into a memory of the integrated circuit; and using the new key corresponding to the new root of trust to delegate the resource of the integrated circuit to a subsequent container.

16. The non-transitory computer readable medium of claim 15, wherein the using of the new key to delegate the resource of the integrated circuit to the subsequent container comprises:

receiving the subsequent container; and determining whether a signature of the subsequent container corresponds to the new root of trust based on the new key.

17. The non-transitory computer readable medium of claim 16, wherein the using of the new key to delegate the resource of the integrated circuit to the subsequent container further comprises:

delegating the resource to the subsequent container in response to a verification of the signature of the subsequent container as being associated with the new root of trust based on the new key.

18. The non-transitory computer readable medium of claim 15, wherein the key that corresponds to the first root of trust is stored by interconnect of the integrated circuit and the new key is stored in a one-time programmable (OTP) memory of the integrated circuit.

19. The non-transitory computer readable medium of claim 15, wherein the storing information corresponding to the new key for the new root of trust into the memory of the integrated circuit comprises:

storing, in the memory, an identification of the resource being assigned to the new root of trust from the first root of trust and being removed from an association with the first root of trust.

20. The non-transitory computer readable medium of claim 15, wherein the container and the subsequent container correspond to executable code.

* * * * *